Dec. 27, 1927.

S. G. NOTTAGE 1,654,305

VENTILATION OF DYNAMO ELECTRIC MACHINES

Filed Aug. 6, 1925     2 Sheets-Sheet 1

WITNESSES:

INVENTOR
Stanley Griggs Nottage.
BY
ATTORNEY

Dec. 27, 1927.

S. G. NOTTAGE 1,654,305

VENTILATION OF DYNAMO ELECTRIC MACHINES

Filed Aug. 6, 1925     2 Sheets-Sheet 2

WITNESSES:

INVENTOR
Stanley Griggs Nottage.
BY
ATTORNEY

Patented Dec. 27, 1927.

1,654,305

UNITED STATES PATENT OFFICE.

STANLEY GRIGGS NOTTAGE, OF MURRAYSVILLE, PENNSYLVANIA, ASSIGNOR TO WESTINGHOUSE ELECTRIC & MANUFACTURING COMPANY, A CORPORATION OF PENNSYLVANIA.

VENTILATION OF DYNAMO-ELECTRIC MACHINES.

Application filed August 6, 1925. Serial No. 48,444.

My invention relates to the ventilation of dynamo-electric machines, and it has particular relation to specific improvements in the ventilation of motor-generator sets for railway service where the space requirements are very rigid.

My invention consists in the disposition or arrangement of a suction fan member which is disposed with the fan blades overhanging the stator windings of the machine to which the fan is applied.

Other details of my invention relate to the utilization of a baffle member, whereby a novel distribution of the air-flow is obtained; the utilization of guide vanes in the stator frame, whereby the discharged air is redirected to flow in two streams, both upward and downward, with a minimum amount of loss from eddies; and the combination of the motor and generator with a single fan member disposed between the stators of the two machines in such manner that the space between the stator windings of the two machines is less than the over-all width of the fan blades.

Figure 1:
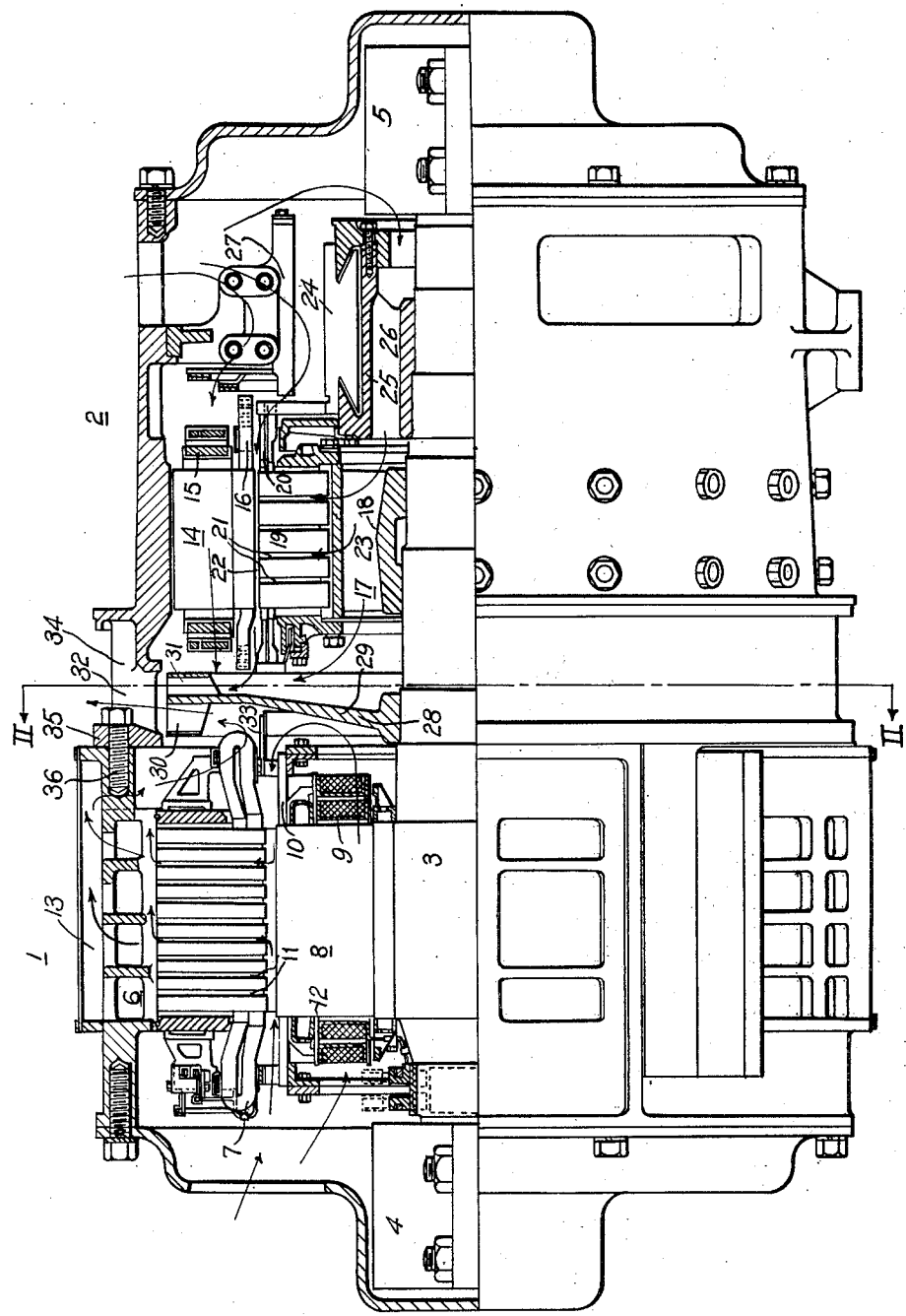
Figure 2:
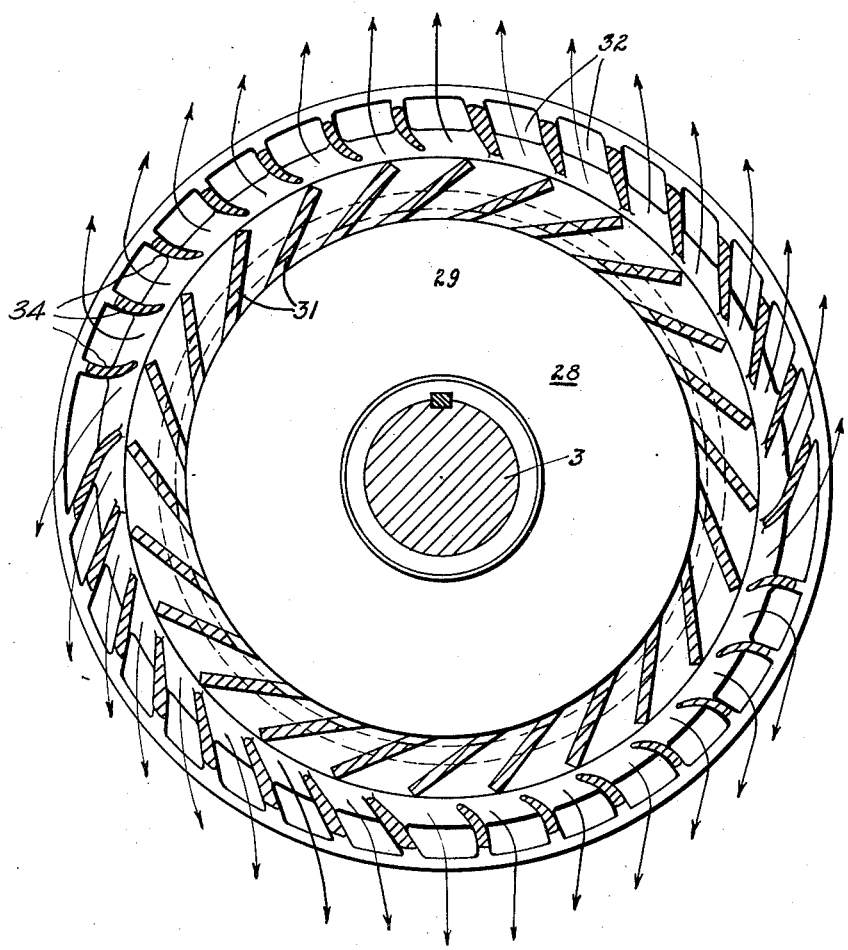

With the foregoing and other objects in view, my invention consists in the details and combinations hereinafter described and claimed, and illustrated in the accompanying drawing, wherein Figure 1 is a longitudinal elevational view, partly in section, illustrating a motor-generator set embodying my invention, and Fig. 2 is a cross-sectional view on the line II—II of Fig. 1, showing the disposition and arrangement of the fan blades and guide vanes.

In Fig. 1, I have shown my invention as employed in connection with a motor-generator set for electric locomotives, and comprising an alternating-current motor 1 and a direct-current generator 2 mounted upon a common shaft 3 which is supported by conventional bearings 4 and 5.

The alternating-current motor 1 is of the synchronous type, the same having a stator member 6, which carries a distributed primary winding 7, and having a salient-pole rotor member 8, which is provided with direct-current exciting coils 9 and a damper winding 10. The stator member 6 is laminated and the laminations are grouped in bunches separated by radial ventilating spaces 11 which extend between the air gap 12 and an outer ventilating space 13 which opens into the space at the inner end of the stator, between the two machines.

The direct-current generator is shown as comprising a salient-pole stator member 14, having exciting windings 15 and interpole or commutator windings 16, and a rotor member 17 comprising an open spider-frame 18 supporting a laminated core 19 which carries the commutator windings 20. The laminations of the core 19 are grouped in bunches which are separated by radial ventilating spaces 21 which extend between the air gap 22 and the axial openings 23 of the spider 18. The rotor of the generator is also provided with a commutator 24 which is supported by a spider 25 having axial ventilating spaces 26 therein. The stator frame carries brush holders 27 for supporting brushes (not shown) in operative engagement with the commutator 24.

On the common shaft 3, between the two rotor members, is a single fan member 28 comprising a supporting web or disc 29 carrying, at its outer periphery, two sets of fan blades 30 and 31.

The fan blades 30 extend on the side of the disc toward the stator member of the alternating-current motor 1, and the inner dimension of the fan blades 30 is less than the maximum outer dimension of the end turns of the stator winding 7 of said motor. The fan blades 30 are thus disposed to overhang the winding 7, this arrangement being adopted in order to economize upon the over-all length of the motor-generator set. The fan blades 31 extend toward the generator stator 14, for drawing the air through the generator half of the motor-generator set.

The path of the ventilating air is clearly shown by the arrows in Fig. 1, the air being sucked in from both ends of the set and discharged through openings 32 in the portion of the stator frame surrounding the fan blades 30 and 31.

A novel feature of the construction consists in the utilization of an annular baffle member 33 bridging the space between the stator windings 7 of the motor and the fan-supporting disc 29, whereby the ventilating air is forced to traverse the air gap 12, entering from both ends of the air gap and being discharged through the circumferential ventilating space 13 into the inner end of the motor stator, where the air is forced downwardly against the end turns of the winding 7 and is thence sucked into the fan blades 30 and expelled through the stator openings 31.

On the motor side of the set, the air is drawn in, by the blades 31, in such manner as to thoroughly ventilate the current-collecting device, the stator member and the rotor member, as will be apparent from an inspection of the drawing.

An important practical detail, which materially increases the efficiency of my ventilating arrangement, consists in the disposition and arrangement of the discharge openings 32 in the stator frame of the motor 2. The discharge openings just mentioned are provided between a plurality of guide vanes 34 which are so shaped as to redirect the expelled air, causing the air from the upper half of the stator to flow in substantially parallel streams in an upward direction and the air from the lower half of the stator to flow in substantially parallel streams in a downward direction. The effect of this construction is to materially reduce the eddy currents which would otherwise be formed, with the effect of reducing the area of the discharge spaces and increasing the friction of the discharged air.

The guide vanes 34 of the stator frame 14 of the motor member are constructed as integral parts of the motor frame. It is thus possible to make the frame as strong as may be desired, at a point where prior designers were in great difficulty to provide sufficient air-exit space without detracting too much from the strength. The guide vanes terminate in an annular ring 35 which connects their ends and serves as an abutting flange which is bolted to the stator frame of the motor, as indicated at 36.

It will be apparent, from the foregoing description, that the joint between the two frames is made in the form of guides to divert the air either up or down, thereby resulting in a most economical utilization of space and materials. This feature, together with the novel disposition and arrangement of the overhanging fan blades 30, the baffle member 32 and the organization of the ventilating spaces 11 and 13 in the motor member all contribute to produce a motor-generator set which is well adapted to meet the difficult conditions of railway locomotive service.

I claim as my invention:

1. The combination with two dynamo-electric machines having mechanically connected stator members and rotatable members mounted relatively near together on a common shaft, said members carrying electrical windings, of a centrally located centrifugal suction fan extending into proximity to the stator frame and comprising a disc carried by the rotatable parts between the two machines and a plurality of annularly disposed blades on each side of said disc, the inner diameter of the blades on at least one side of said disc being greater than the maximum diameter of the adjacent stator windings, the core carrying said last-mentioned windings being provided with radial ventilating slots joining with an outer ventilating space leading to said fan, and cylindrical baffle means extending into such proximity to said disc as to cause a large portion of the air expelled from the adjacent end of the corresponding rotatable member to enter the air gap and to be drawn through said radial ventilating slots and outer ventilating space and thence back to the inner circumference of the fan blades on that side of the disc.

2. The combination with two dynamo-electric machines having mechanically connected stator members and rotatable members mounted relatively near together on a common shaft, said members carrying electrical windings, of a centrally located centrifugal suction fan carried by the rotatable parts and comprising a plurality of annularly disposed blades, the stator frame having guide openings around said centrifugal fan and so directed as to cause the expelled air from each half of the periphery to flow in a plurality of substantially parallel paths away from the machines.

3. A dynamo-electric machine comprising a stator member, a rotor member disposed within said stator member with an air gap therebetween, distributed windings on said stator member adjacent to said air gap and having end connections disposed in the spaces at the ends of the machine, a centrifugal suction fan extending into proximity to the stator frame and comprising a disc carried by one end of the rotor member and a plurality of peripherally disposed blades projecting laterally toward said stator windings, the inner diameter of the blades being greater than the outer diameter of the adjacent end connections of said stator windings, the stator frame having outlet openings surrounding said fan, the stator core being provided with radial ventilating slots joining with an outer ventilating space leading to said fan, and cylindrical baffle means extending into such proximity to said disc as to cause a large portion of the air expelled from the adjacent end of the rotor member to enter the air gap and to be drawn through said radial ventilating slots and outer ventilating space and thence back to the inner circumference of the fan blades.

4. A dynamo-electric machine comprising a stator member, a rotor member disposed within said stator member, and a centrifugal suction fan carried by the rotor member and having blades disposed in proximity to the periphery of the stator frame, the stator frame having a plurality of guide openings around each half of said centrifugal fan and so directed as to cause the expelled air from each half of the periphery to flow in a plurality of substantially parallel paths away from the machine.

5. A dynamo-electric machine comprising a stator member, a rotor member disposed within said stator member, and ventilating means having inlet openings and outlet openings, said outlet openings being circumferentially arranged and including redirecting guides so shaped that the air leaving each half of the circumference is redirected at a plurality of points into paths substantially at right angles to the diameter separating said halves.

In testimony whereof, I have hereunto subscribed my name this 8th day of July, 1925.

STANLEY GRIGGS NOTTAGE.